United States Patent
Griffin

[19]

[11] Patent Number: 6,056,911
[45] Date of Patent: May 2, 2000

[54] METHODS OF TREATING PREFORM ELEMENTS INCLUDING POLYCRYSTALLINE DIAMOND BONDED TO A SUBSTRATE

[75] Inventor: Nigel Dennis Griffin, Whitminster, United Kingdom

[73] Assignee: Camco International (UK) Limited, Stonehouse, United Kingdom

[21] Appl. No.: 09/114,640

[22] Filed: Jul. 13, 1998

[30] Foreign Application Priority Data

May 27, 1998 [GB] United Kingdom ................... 9811213

[51] Int. Cl.$^7$ ................................................. B29B 17/00
[52] U.S. Cl. ........................................... 264/346; 264/348
[58] Field of Search ..................... 264/232, 235, 264/237, 345, 346, 348, 81; 427/249, 374.3

[56] References Cited

U.S. PATENT DOCUMENTS

| | | | |
|---|---|---|---|
| 5,190,796 | 3/1993 | Iacovangelo | 427/304 |
| 5,309,000 | 5/1994 | Saito et al. | 257/76 |
| 5,523,121 | 6/1996 | Anthony et al. | 427/249 |
| 5,614,140 | 3/1997 | Pinneo | 264/81 |
| 5,626,909 | 5/1997 | Iacovangelo | 427/250 |

FOREIGN PATENT DOCUMENTS

| | | |
|---|---|---|
| 2 021 154 | 11/1979 | United Kingdom . |
| 2 158 101 | 11/1985 | United Kingdom . |
| 2 275 690 | 9/1994 | United Kingdom . |

*Primary Examiner*—Christopher A. Fiorilla
*Attorney, Agent, or Firm*—Jeffery E. Daly

[57] ABSTRACT

A method of thermally treating a preform element, of the kind having a facing table of polycrystalline diamond bonded to a substrate of cemented tungsten carbide, is disclosed. The steps of the method are: (a) heating the element to a soaking temperature of about 600° C., (b) maintaining the temperature of the element at that temperature for two to three hours, and (c) cooling the element to ambient temperature. These steps are preferably then followed by a flash heating cycle. These steps are: (d) heating the element to a temperature in the range of 750–850° C., (e) maintaining the temperature of the element at that temperature for about four seconds, and (f) cooling the element to ambient temperature. This thermal treatment relieves residual stresses in the element in order to reduce the risk of cracking or delamination of the element in use.

17 Claims, 1 Drawing Sheet

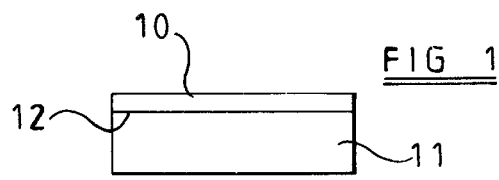
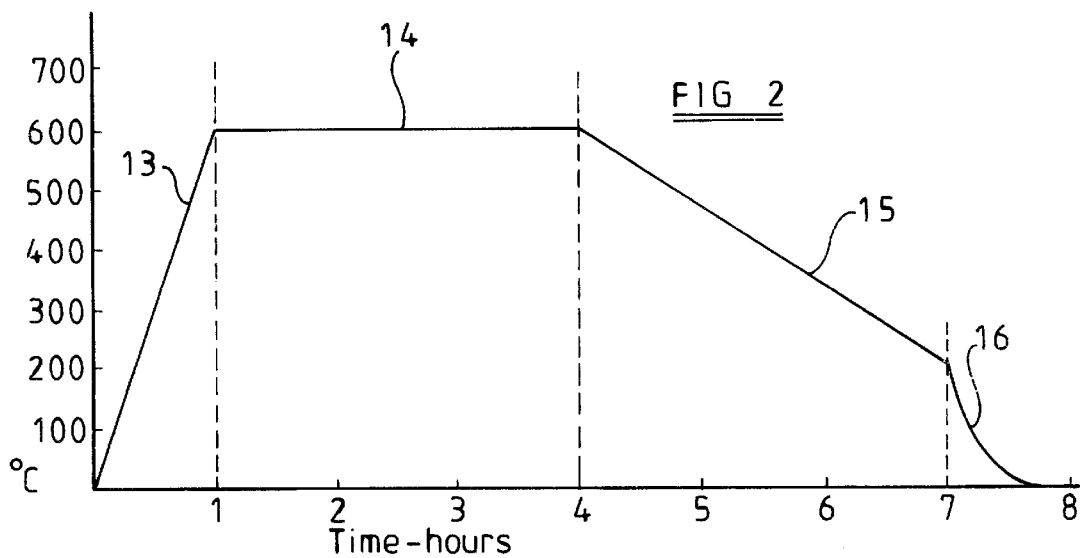
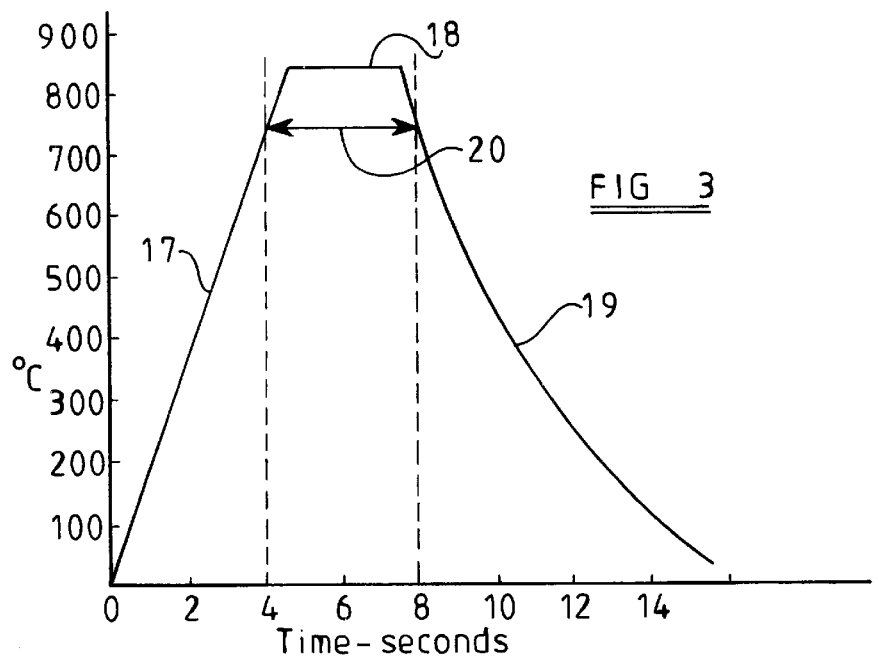

METHODS OF TREATING PREFORM ELEMENTS INCLUDING POLYCRYSTALLINE DIAMOND BONDED TO A SUBSTRATE

BACKGROUND OF THE INVENTION

1. Field of the Invention

The invention relates to preform elements of the kind comprising a facing table of polycrystalline diamond bonded to a substrate of less hard material, such as cemented tungsten carbide.

2. Description of Related Art

Preform elements of this kind are often used as cutting elements in rotary drag-type drill bits, and the present invention is particularly applicable to the treatment of such preform cutting elements before they are mounted on the drill bit. However, the invention is not restricted to cutting elements for this particular use, and may relate to preform elements for other purposes, for example as cutters on roller cone and percussive bits. Also, preform elements of the kind referred may also be employed in workpiece-shaping tools, high pressure nozzles, wire-drawing dies, bearings and other parts subject to sliding wear, as well as elements subject to percussive loads as may be the case in tappets, cams, cam followers, and similar devices in which a surface of high wear-resistance is required.

Preform elements of the kind to which the invention relates are generally manufactured by pre-forming the substrate in the appropriate required shape, applying a layer of diamond particles to the surface of the substrate and then subjecting the substrate and diamond layer to very high pressure and temperature in a forming press so that the diamond particles bond together and the diamond layer bonds to the substrate. This manufacturing process is well known and will not be described in detail.

Each preform cutting element may be mounted on a carrier in the form of a generally cylindrical stud or post received in a socket in the body of the drill bit. The carrier is often formed from cemented tungsten carbide, the surface of the substrate being brazed to a surface on the carrier, for example by a process known as "LS bonding". In this process the diamond facing layer is cooled while the surface of the substrate is brazed to the carrier. The reason for this is that the polycrystalline diamond facing table is not thermally stable above about 725° C. and will begin to graphitise. The cooling of the facing table is therefore necessary, since the brazing process would otherwise raise the temperature of the preform element above this critical temperature.

Such preform cutting elements are subject to high temperatures and heavy loads when the drill bit is in use down a borehole. It is found that as a result of such conditions cracking of the substrate can occur. Also, spalling and delamination of the polycrystalline diamond facing table can occur, that is to say the separation and loss of the diamond over the cutting surface of the table. This may also occur in preform elements used for other purposes and particularly where the elements are subjected to repetitive percussive loads, as in tappets and cam mechanisms. It is believed that the tendency for cracking, spalling and delamination to occur depends in part on the residual stresses which are left in the preform element at the end of the process of forming the element and fitting it to the bit body. It is therefore common practice to heat-treat the preform elements after formation in the press and before mounting on the bit body in order to relieve some of the residual stresses in the element and thereby reduce the tendency of the elements to crack or delaminate in use.

One common method of heat treatment, designed to achieve thermal stress relief, is to maintain the preform elements at temperatures of up to 500° C. for a considerable extended period, for example up to 48 hours. However, while this is believed to have some stress relieving effect, subsequent cracking and delamination of the preform elements may still subsequently occur.

The present invention provides a new form of heat treatment for preform elements which may not only achieve more effective thermal stress management, but which also reduces the time cycle for manufacturing each element and thus enables output to be increased.

SUMMARY OF THE INVENTION

According to the invention there is provided a method of treating a preform element having a facing table of polycrystalline diamond bonded to a substrate of less hard material, the method comprising a first step of:

(a) heating the element to a soaking temperature in the range of 550–700° C., (b) maintaining the temperature of the element in said range for a period of at least one hour, and (c) cooling the element to ambient temperature, followed by the second step of:

(d) heating the element to a temperature above 725° C., (e) maintaining the temperature of the element above 725° C. for a period not exceeding five seconds, and (f) cooling the element to ambient temperature.

As previously mentioned, the substrate may comprise cemented tungsten carbide, that is to say tungsten carbide particles in a binder phase, and it is believed that the first step of the method of the invention, where the temperature of the element is maintained above 550° C. for at least an hour, causes stable phases to precipitate within the binder phase of the carbide substrate. Thus, the effect of the first step, which is effectively a stabilisation cycle, is to relieve internal stresses in the element, to prevent such internal stresses causing cracking in the substrate, i.e. it toughens the substrate material.

This step alone will reduce the tendency of the substrate to crack and it may also have some effect in inhibiting delamination. However by subjecting the element to the second step, both the tendency to crack or to delaminate are substantially inhibited. It will be noted that in the second step of the treatment the element is heated to a temperature which is greater than the temperature at which the polycrystalline diamond will normally begin to graphitise. However, according to the invention the temperature is raised above this critical temperature for only a very short period, no more than five seconds, and it is found that the activation energy resulting from such temporary overheating of the diamond layer is insufficient to initiate graphitisation of the diamond, but is sufficient to relieve residual stress in the element by plastic deformation. This greatly toughens the material.

Preferably in step (a) the temperature of the element is raised to a value in the range of 575–625° C., and more preferably to about 600° C.

Preferably in step (b) the temperature of the element is maintained in said range for a period of at least two hours, but less than three hours.

In the heating step (a) the temperature of the element may be raised to the soaking temperature gradually, for a period in the range of one half to one and a half hours, and more preferably for a period of about one hour.

Preferably at least steps (a) and (b) and/or the steps (d) and (e) are effected in a non-oxidizing atmosphere.

In the cooling step (c) the temperature of the element is preferably reduced from the soaking temperature gradually, for a period in the range of three to four hours, and more preferably for a period of about three hours. In this cooling step the element may be allowed to cool gradually to about 200° C., then being quenched to bring it to ambient temperature.

Preferably in step (d) the element is heated to a temperature above 750° C. The temperature to which the element is heated is preferably below about 850° C.

In step (e) the temperature of the element is preferably maintained above 725° C. for a period of about four seconds.

The first part of the method, i.e. the steps (a), (b) and (c), or the second part of the method, i.e. the steps (d), (e) and (f), may each be advantageous if used alone, without the following or preceding steps, to relieve residual stress in a preform element.

Accordingly, therefore, the invention also provides a method of treating a preform element having a facing table of polycrystalline diamond bonded to a substrate of less hard material, the method comprising a first step of:

(a) heating the element to a soaking temperature in the range of 550–700° C., (b) maintaining the temperature of the element in said range for a period of at least one hour, and (c) cooling the element to ambient temperature.

The invention further provides a method of treating a preform element having a facing table of polycrystalline diamond bonded to a substrate of less hard material, the method comprising the steps of: heating the element to a temperature above 725° C., maintaining the temperature of the element above 725° C. for a period not exceeding five seconds, and then cooling the element to ambient temperature.

BRIEF DESCRIPTION OF THE DRAWINGS

FIG. 1 is a diagrammatic sectional view of a typical preform element of the kind to which the present invention relates.

FIG. 2 is a graph representing a typical stabilisation cycle of the heat treatment according to the present invention.

FIG. 3 is a graph illustrating a flash heating cycle of the treatment according to the present invention.

DETAILED DESCRIPTION OF THE PREFERRED EMBODIMENT

Referring to FIG. 1, a typical preform element of the kind to which the present invention relates comprises a thin facing table 10 of polycrystalline diamond bonded to a substrate 11 of cemented tungsten carbide. When used as cutters in rotary drag-type drill bits, such elements are often in the form of circular or part-circular tablets although other shapes are possible. In FIG. 1 the interface 12 between the facing table 10 and substrate 11 is shown as flat but it is also common practice to preform the substrate 11 so as to provide an interface which is non-planar and configured, thereby providing some mechanical interlocking between the facing table and substrate. Also, there may be provided a transition layer between the facing table and substrate, such transition layer having characteristics intermediate those of the facing table and substrate. For example, the coefficient of thermal expansion of the material of the substrate is substantially greater than that of the facing table, and the transition layer will therefore normally have a coefficient of thermal expansion which is intermediate the coefficients of the two other materials so as to reduce stresses which would otherwise arise during heating and cooling of the element.

FIG. 2 shows a typical stabilisation heating cycle comprising steps (a) to (c) of the present invention.

Referring to FIG. 2, the graph plots temperature against time. The first portion 13 of the graph shows the gradual heating of the preform element over a period of one hour so as to raise its temperature to about 600° C. As shown by section 14 of the graph, the element is then maintained at the temperature of 600° C. for about two hours. As indicated by section 15 of the graph, the element is then allowed to cool gradually to about 200° C. over a period of about three hours and is then quenched to ambient temperature, as indicated by section 16 of the graph.

Although in this example the element is maintained at a temperature of about 600° C., advantage may also be obtained by maintaining the element at a temperature anywhere in the range of 550–700° C., as previously described.

As previously mentioned, the heating and cooling stabilisation cycle just described can be advantageous in stress management when used alone. However, the element is preferably subsequently passed through a flash heating cycle as illustrated by the graph in FIG. 3. In this cycle the element is heated rapidly, as indicated by section 17 of the graph, to a temperature above 750° C., for example about 850° C. It is held at that temperature for only a very short period, as indicated at 18, and is then cooled rapidly to ambient temperature as indicated at 19. The heating and cooling is such that the period for which the element is above 750° C. is about four seconds as indicated at 20 on the graph.

Preferably the heating in the stabilisation cycle and/or in the flash heating cycle is effected in a non-oxidizing atmosphere. The flash heating cycle illustrated in FIG. 3 may be effected by rapid induction heating, by use of laser heating or by any other appropriate heating means. The temperature of the element may be determined by an infra-red temperature sensing device.

The flash heating cycle may also be advantageous in relieving stress in the preform element when used alone, without being preceded by the stabilisation heating cycle.

The methods specifically described above employ particular parameters of the method according to the invention which are found to be particularly effective in reducing the tendency of the preform element to crack or delaminate in subsequent use, but advantage in this respect may also be obtained by using parameters in any of the ranges previously specified.

Whereas the present invention has been described in particular relation to the drawings attached hereto, it should be understood that other and further modifications, apart from those shown or suggested herein, may be made within the scope and spirit of the present invention.

What is claimed:

1. A method of treating a preform element having a facing table of polycrystalline diamond bonded to a substrate of less hard material, the method comprising the steps of:

(d) heating the element to a temperature above 725° C., (e) maintaining the temperature of the element above 725° C. for a period not exceeding five seconds, and (f) cooling the element to ambient temperature.

2. A method according to claim 1 wherein, in step (d), the element is heated to a temperature above 750° C. and below about 850° C.

3. A method according to claim 1 wherein, in step (e), the temperature of the element is maintained above 725° C. for about four seconds.

4. A method according to claim 1, wherein at least steps (d) and (e) are effected in a non-oxidizing atmosphere.

5. A method of treating a preform element having a facing table of polycrystalline diamond bonded to a substrate of less hard material, the method comprising a first step of:
(a) heating the element to a soaking temperature in the range of 550–700° C.,
(b) maintaining the temperature of the element in said range for a period of at least one hour, and
(c) cooling the element to ambient temperature, followed by the second step of:
(d) heating the element to a temperature above 725° C.,
(e) maintaining the temperature of the element above 725° C. for a period not exceeding five seconds, and
(f) cooling the element to ambient temperature.

6. A method according to claim 5, wherein, in step (a), the temperature of the element is raised to a value in the range of 575–625° C.

7. A method according to claim 6, wherein, in step (a), the temperature of the element is raised to about 600° C.

8. A method according to claim 5 wherein, in step (b), the temperature of the element is maintained in said range for a period of at least two hours, but less than three hours.

9. A method according to claim 5 wherein, in the heating step (a), the temperature of the element is raised to the soaking temperature gradually, for a period in the range of one half to one and a half hours.

10. A method according to claim 9 wherein, in the heating step (a), the temperature of the element is raised to the soaking temperature gradually for a period of about one hour.

11. A method according to claim 5, wherein at least steps (a) and (b) are effected in a non-oxidizing atmosphere.

12. A method according to claim 5, wherein at least steps (d) and (e) are effected in a non-oxidizing atmosphere.

13. A method according to claim 5 wherein, in the cooling step (c), the temperature of the element is reduced from the soaking temperature gradually, for a period in the range of three to four hours.

14. A method according to claim 13 wherein, in step (c), the element is allowed to cool gradually to about 200° C., then being quenched to bring it to ambient temperature.

15. A method according to claim 5 wherein, in step (d), the element is heated to a temperature above 750° C. and below about 850° C.

16. A method according to claim 5 wherein, in step (e), the temperature of the element is maintained above 725° C. for about four seconds.

17. A method of treating a preform element having a facing table of polycrystalline diamond bonded to a substrate of cemented tungsten carbide to toughen said substrate, the method comprising the steps of:
(a) heating the element to a soaking temperature in the range of 550–700° C,
(b) maintaining the temperature of the element in said range for a period of at least one hour,
(c) reducing the temperature of the element from the soaking temperature gradually, for a period in the range of three to four hours to about 200° C, then quenching the elemtn to bring it to ambient temperature.

* * * * *